Patented July 30, 1935

2,009,480

UNITED STATES PATENT OFFICE 2,009,480

ANTIOXIDANT

David Craig, Akron, Ohio, assignor to The B. F. Goodrich Company, New York, N. Y., a corporation of New York No Drawing. Application June 10, 1932, Serial No. 616,491

34 Claims. (Cl. 18—50)

This invention relates particularly to the art of rubber manufacture and especially to the preservation of rubber or rubber goods, but also to the preservation of other oxidizable organic substances such as fatty oils, petroleum oils, etc.

It is well known that many organic substances undergo a more or less rapid deterioration which is commonly ascribed to the action of atmospheric oxygen. It has heretofore been proposed to retard or inhibit this deterioration by adding a small proportion of a phenol, an aromatic base, or some other like substance, termed generally an "anti-oxidant".

I have discovered a new class of anti-oxidants or age-resistors which are extraordinarily effective in retarding the deterioration of rubber and like organic materials. This new class of substances may be defined as consisting of diarylamines in which an aliphatic hydrocarbon radical containing at least two and preferably three or more carbon atoms is substituted on one of the aryl groups. The aliphatic radical may be one of the ordinary straight chain alkyl radicals, although in many cases the branched chain compounds are preferred.

The new class of anti-oxidants includes such typical compounds as p-ethyl diphenylamine, m-ethyl diphenylamine, o-ethyl diphenylamine, p-isopropyl diphenylamine (phenyl cumidine) m-isopropyl diphenylamine, o-isopropyl diphenylamine, n-propyl diphenylamine, n-butyl diphenylamine, secondary butyl diphenylamine, isobutyl diphenylamine, tertiary butyl diphenylamine, the amyl, hexyl, heptyl, octyl, nonyl, decyl, hexadecyl, cyclohexyl, methyl cyclohexyl, and other alkyl substituted diphenylamines; dialkyl substituted compounds such as 2-methyl 5-isopropyl diphenylamine (phenylaminocymene or phenyl carvacrylamine), p-isopropyl p'-methyl diphenylamine (p-tolyl cumidine), ethyl-phenyl p-toluidine, ethyl-phenyl xylidine, butyl-phenyl p-toluidine, heptyl-phenyl p-toluidine, cyclohexyl-phenyl p-toluidine, p,p'-di-isopropyl diphenylamine (dicumylamine), 2,2' dimethyl 5,5' di-isopropyl diphenylamine (dicarvacrylamine), 2,2' di-isopropyl 5,5' dimethyl diphenylamine (dithymylamine), p,p'-di-tertiary butyl diphenylamine, p,p'-di-tertiary amyl diphenylamine, etc.; compounds containing polynuclear aromatic radicals such as p-isopropyl p'phenyl diphenylamine, p-isopropyl p'phenylamino biphenyl, p-isopropyl phenyl beta naphthylamine, p-tertiary butyl phenyl beta naphthylamine, heptyl phenyl alpha naphthylamine, 1-isopropyl 4-phenylamino naphthalene, etc., and even compounds containing more than one amino group, such as monocumyl p-phenylene diamine, dicumyl p-phenylene diamine, dicumyl benzidine, dicumyl diamino diphenyl methane, cumyl-amino dimethyl aniline, etc. Compounds within the above-mentioned class of substances but including alkoxy groups, such as p-methoxy p'-isopropyl diphenylamine (cumyl anisidine), p-ethoxy p'-isopropyl diphenylamine (cumyl phenetidine), p-tertiary butyl o-methoxy diphenylamine and other like compounds including alkoxy groups such as methoxy, ethoxy, propoxy, or butoxy groups, are also included within the broad scope of the invention since they are in all respects very similar to the simple alkyl substituted compounds and confer similar deterioration resistant properties on rubber or other oxidizable organic substances.

Any of the above-mentioned class of anti-oxidants may be added to the organic substance which is to be protected against deterioration, preferably in relatively small proportions, say from 0.1% to 5%, although either smaller or greater proportions may be found desirable in some cases. The substance so treated will deteriorate far less rapidly than if the anti-oxidant were not employed.

As a specific example of the extraordinary anti-oxidant activity of the anti-oxidants of this invention, a rubber composition is prepared containing 100 parts by weight of rubber, 5.5 parts of sulphur, 30 parts of zinc oxide, 40 parts of gas black, 10 parts of mineral rubber, 5 parts of palm oil, and 0.75 parts of hexamethylene tetramine. This composition when vulcanized in a press for 45 minutes at 294° F. to give an optimum cure exhibits an ultimate tensile strength of about 3500 pounds per square inch at an elongation of about 650 per cent. After being subjected to an accelerated aging test in the so-called Geer oven, in which it is maintained at a temperature of 158° F. (70° C.) in a constantly renewed stream of air for a period of 7 days, this rubber composition deteriorates to a tensile strength of about 1800 pounds per square inch at an elongation of about 450 per cent. The addition of 0.95 parts by weight (0.5% of the weight of the composition) of a simple diarylamine, namely diphenylamine, to this rubber composition, only slightly retards the deterioration in the accelerated aging test described above, the deterioration being about 90% of that of the base composition. Even the introduction of a methyl group into the diarylamine does not improve its anti-oxidant properties, for a composition containing phenyl p-toluidine deteriorates 91% as much as the base composition. On the other hand, the introduction of one or more alkyl groups containing more than one carbon atom into the aromatic nuclei of the diarylamine effects a remarkable increase in anti-oxidant activity. For example, if 0.5% of p-isopropyl diphenylamine is added to the rubber composition described above, its deterioration is found to be only 35% as great as that of the base composition, while with p-tertiary amyl diphenylamine it is only 21% and with p,p' di-tertiary butyl diphenylamine it is only 19% as great.

The invention has been specifically described above with reference to a heavily reinforced rubber composition such as is employed in automobile tire treads, but it is equally applicable to any other type of rubber composition such as those used in the manufacture of inner tubes for automobile tires, hose, belting, sheet and thread rubber, rubberized fabrics, molded goods, rubber boots and shoes, seamless dipped rubber goods, and the like. The anti-oxidants may also be added in small proportions to other oxidizable organic materials such as mineral or fatty oils, soaps, coating compositions, etc. with good effect on their resistance to deterioration. Any substance within the scope of the invention as herein defined, and specifically any one of the substances enumerated above, may be employed alone or in admixture with each other or with other anti-oxidants, accelerators of vulcanization, or other additive ingredients.

The anti-oxidants of this invention vary in activity over a considerable range, but they all alike appreciably retard the normal deterioration of rubber and other organic materials. The choice of anti-oxidant in any given case will be governed by such considerations as price, availability, solubility in the organic material, and activity under the particular conditions to which it will be subjected. Under certain conditions other factors such as discoloration, effect on fatigue cracking, etc. may also receive consideration. The activity of the para substituted compounds is generally somewhat higher than that of the corresponding ortho and meta compounds. In general the simpler branched chain substituted diphenylamines such as p-isopropyl diphenylamine are preferred because of their high degree of activity and comparatively low cost.

It is to be understood that the term "treating" as employed in the appended claims is used in a generic sense to denote the incorporation of the anti-oxidants into the rubber or other material by milling, mastication or other like process, by simple solution in a liquid material, by mixing in finely dispersed form with aqueous dispersions such as rubber latex, or by any equivalent method such as by application to the surface of a solid material, in the form of a solution, suspension or powder. The term "rubber" is likewise employed in a generic sense to include caoutchouc, balata, gutta-percha, reclaimed rubber, synthetic rubber, rubber isomers, and like products, whether or not admixed with fillers, pigments, or vulcanizing and accelerating agents.

The term "diarylamine", unless otherwise limited, is employed in the appended claims to designate compounds containing at least one secondary amino group directly bonded to two distinct aromatic nuclei, but containing no substituents other than hydrocarbon groups and amino groups, unless such other groups are specially designated in the claims.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of retarding the deterioration of rubber which comprises treating rubber with from 0.1% to 5% of a substance selected from the class consisting of diarylamines having at least one aliphatic hydrocarbon group which contains at least two carbon atoms substituted in the aromatic nucleus, and alkoxy derivatives of such diarylamines.

2. The method of retarding the deterioration of rubber which comprises treating rubber with from 0.1% to 5% of a diaryl monoamine having at least one aliphatic hydrocarbon group which contains at least two carbon atoms substituted in the aromatic nucleus.

3. The method of retarding the deterioration of rubber which comprises treating rubber with from 0.1% to 5% of a diaryl monoamine having at least one aliphatic hydrocarbon group which contains more than two carbon atoms substituted in the aromatic nucleus.

4. The method of retarding the deterioration of rubber which comprises treating rubber with from 0.1% to 5% of a diarylamine having at least one branched chain alkyl group substituted in the aromatic nucleus.

5. The method of retarding the deterioration of rubber which comprises treating rubber with from 0.1% to 5% of a diarylamine having an aliphatic hydrocarbon group which contains more than two carbon atoms substituted in the para position.

6. The method of retarding the deterioration of rubber which comprises treating rubber with from 0.1% to 5% of a diarylamine having at least one branched chain alkyl group substituted in the para position.

7. The method of retarding the deterioration of rubber which comprises treating rubber with from 0.1% to 5% of a diaryl monoamine having at least one branched chain alkyl group substituted in the aromatic nucleus.

8. The method of retarding the deterioration of rubber which comprises treating rubber with from 0.1% to 5% of a diaryl monoamine having an alkyl group containing more than two carbon atoms substituted in the para position.

9. The method of retarding the deterioration of rubber which comprises treating rubber with from 0.1% to 5% of a diarylamine having at least one isopropyl group substituted in the para position.

10. The method of retarding the deterioration of rubber which comprises treating rubber with from 0.1% to 5% of p-isopropyl diphenylamine.

11. The method of retarding the deterioration of rubber which comprises treating rubber with a diarylamine having at least two alkyl groups, at least one of which contains at least two carbon atoms, substituted in the aromatic nucleus.

12. The method of retarding the deterioration of rubber which comprises treating rubber with a diarylamine having two alkyl groups, at least one of which is a branched chain alkyl group, and at least one of which is substituted in the para position.

13. The method of retarding the deterioration of rubber which comprises treating rubber with a diarylamine having at least one tertiary butyl group substituted in the para position.

14. The method of retarding the deterioration of rubber which comprises treating rubber with p,p′ di-tertiary butyl diphenylamine.

15. The method which comprises vulcanizing rubber in the presence of from 0.1% to 5% of a diarylamine having an aliphatic hydrocarbon group which contains more than two carbon atoms substituted in the aromatic nucleus.

16. The method which comprises vulcanizing rubber in the presence of from 0.1% to 5% of a diaryl monoamine having at least one branched chain alkyl group substituted in the para position.

17. The method which comprises vulcanizing rubber in the presence of from 0.1% to 5% of p-isopropyl diphenylamine.

18. A rubber composition comprising rubber and from 0.1% to 5% of a diarylamine having at least one aliphatic hydrocarbon group which contains more than two carbon atoms substituted in the aromatic nucleus.

19. A rubber composition comprising rubber and from 0.1% to 5% of a diarylmonoamine having at least one alkyl group containing more than two carbon atoms substituted in the para position.

20. A rubber composition comprising rubber and from 0.1% to 5% of a diphenylamine containing at least one branched chain alkyl group substituted in the para position.

21. A vulcanized rubber composition which has been vulcanized in the presence of from 0.1% to 5% of a diarylamine containing a branched chain alkyl group substituted in the para position.

22. The method of preserving rubber which comprises treating rubber with a diarylamine having a straight chain aliphatic hydrocarbon group which contains at least two carbon atoms substituted in the aromatic nucleus.

23. The method of preserving rubber which comprises treating rubber with a diarylamine having a straight chain alkyl group which contains more than two carbon atoms substituted in the aromatic nucleus.

24. The method of preserving rubber which comprises treating rubber with a diphenylamine having a straight chain aliphatic hydrocarbon group which contains at least two carbon atoms substituted in the aromatic nucleus.

25. The method if preserving rubber which comprises treating rubber with a diphenylamine having a straight chain alkyl group which contains at least two carbon atoms substituted in the para position.

26. The method of preserving rubber which comprises treating rubber with p-hexadecyl diphenylamine.

27. A rubber composition comprising rubber and from 0.1% to 5% of p-isopropyl diphenylamine.

28. A rubber composition comprising rubber and p,p′di-tertiary butyl diphenylamine.

29. A rubber composition comprising rubber and a diarylamine having a straight chain aliphatic hydrocarbon group which contains more than two carbon atoms substituted in the aromatic nucleus.

30. A rubber composition comprising rubber and a diphenylamine having a straight chain alkyl group which contains more than two carbon atoms substituted in the para position.

31. A rubber composition comprising rubber and p-hexadecyl diphenylamine.

32. The method of preserving rubber which comprises treating rubber with a diarylamine having a branched chain alkyl group substituted on each aromatic nucleus.

33. The method of preserving rubber which comprises treating rubber with diphenylamine having a branched chain alkyl group substituted on each benzene nucleus in the para position.

34. A rubber composition which has been vulcanized in the presence of a p,p′ di (branched chain alkyl) substituted diphenylamine.

DAVID CRAIG.